(12) United States Patent
Higuchi et al.

(10) Patent No.: US 8,913,348 B2
(45) Date of Patent: Dec. 16, 2014

(54) SUSPENSION BOARD WITH CIRCUIT

(71) Applicant: Nitto Denko Corporation, Osaka (JP)

(72) Inventors: Naotaka Higuchi, Osaka (JP); Hitoki Kanagawa, Osaka (JP); Tadashi Takahashi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 14/086,331

(22) Filed: Nov. 21, 2013

(65) Prior Publication Data
US 2014/0160599 A1    Jun. 12, 2014

(30) Foreign Application Priority Data

Dec. 11, 2012   (JP) ................................ 2012-270507

(51) Int. Cl.
*G11B 5/56* (2006.01)
*G11B 5/48* (2006.01)

(52) U.S. Cl.
CPC .............. *G11B 5/486* (2013.01); *G11B 5/4873* (2013.01)
USPC ..................................... 360/294.4; 360/234.5

(58) Field of Classification Search
USPC ........................................... 360/234.5, 294.4
See application file for complete search history.

(56) References Cited

U.S. PATENT DOCUMENTS

| | | | |
|---|---|---|---|
| 6,501,623 B1 * | 12/2002 | Sassolini et al. ............ | 360/245.3 |
| 6,614,627 B1 | 9/2003 | Shimizu et al. | |
| 8,508,888 B2 * | 8/2013 | Ohsawa ..................... | 360/234.5 |
| 2004/0027727 A1 | 2/2004 | Shimizu et al. | |
| 2006/0238921 A1 * | 10/2006 | Matsumoto et al. ....... | 360/234.5 |
| 2007/0041129 A1 | 2/2007 | Shimizu et al. | |
| 2009/0080117 A1 | 3/2009 | Shimizu et al. | |
| 2011/0096438 A1 * | 4/2011 | Takada et al. .............. | 360/244.2 |
| 2012/0087041 A1 * | 4/2012 | Ohsawa ..................... | 360/234.5 |

FOREIGN PATENT DOCUMENTS

| | | | |
|---|---|---|---|
| JP | 2001-307442 A | 11/2001 | |
| JP | 2007-059048 A | 3/2007 | |
| JP | 2010-146631 A | 7/2010 | |

* cited by examiner

*Primary Examiner* — Wayne Young
*Assistant Examiner* — Carlos E Garcia
(74) *Attorney, Agent, or Firm* — Jean C. Edwards, Esq.; Edwards Neils PLLC

(57) ABSTRACT

A suspension board with circuit includes a metal supporting layer, an insulating base layer formed on the metal supporting layer, a conductive layer formed on the insulating base layer, and a slider supported on the metal supporting layer via a pedestal. The conductive layer includes a conductive overlapping portion which overlaps a plane on which the slider is projected when projected in a thickness direction. The conductive overlapping portion is provided to be spaced apart from the slider.

10 Claims, 12 Drawing Sheets

FIG. 1
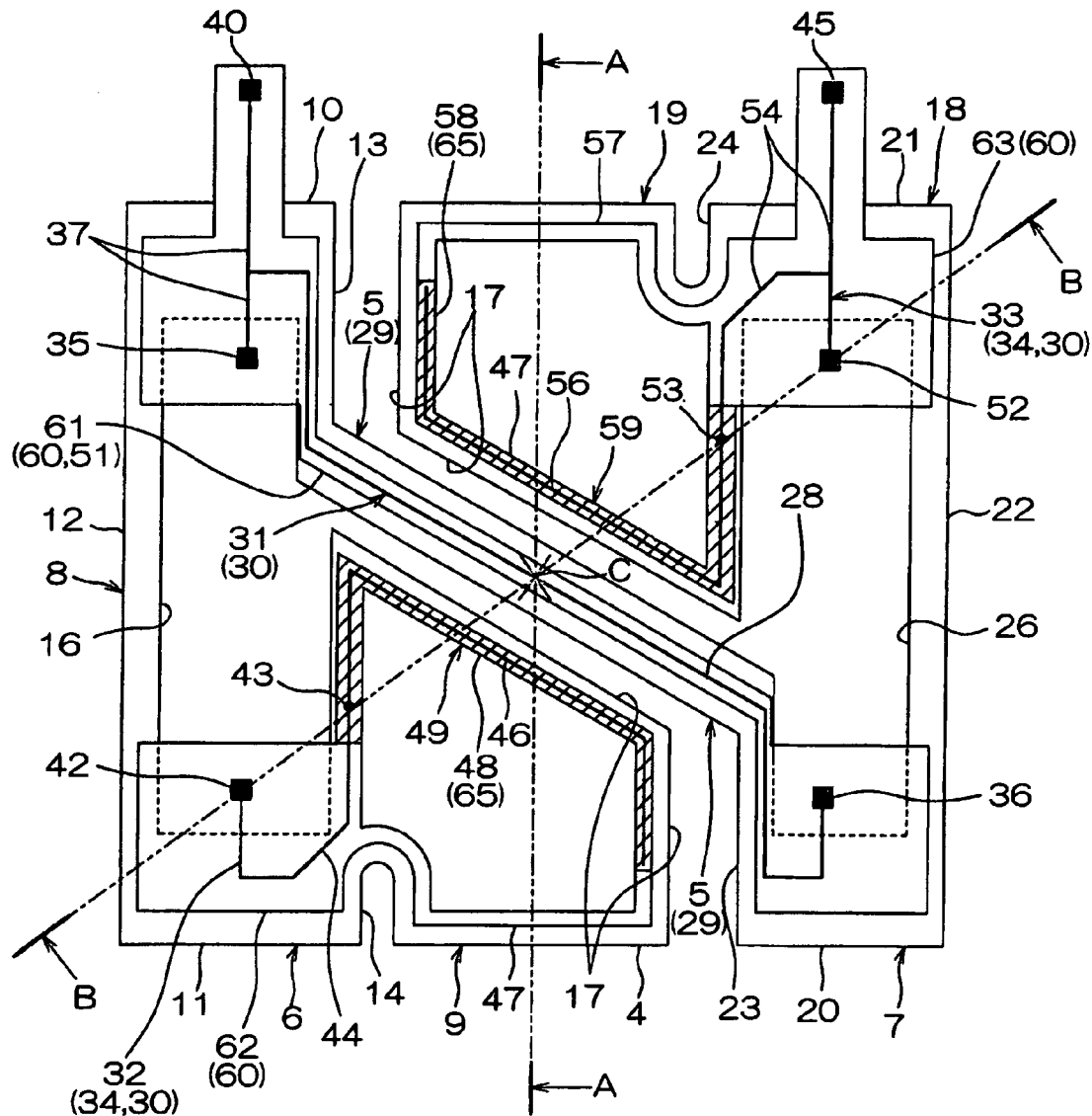
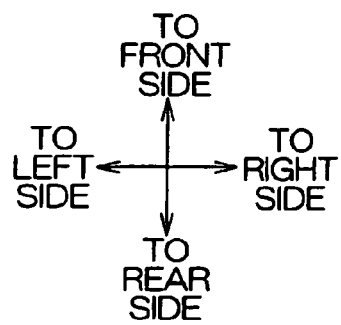

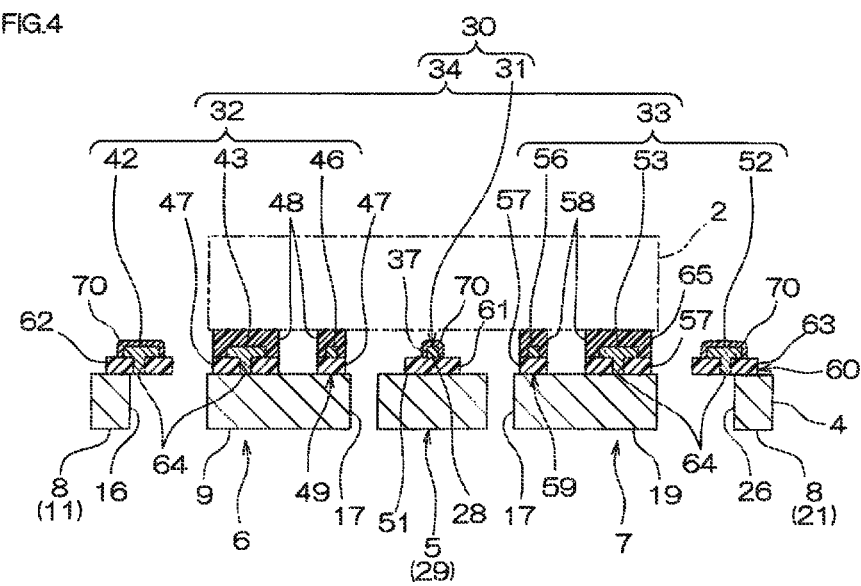
FIG.4
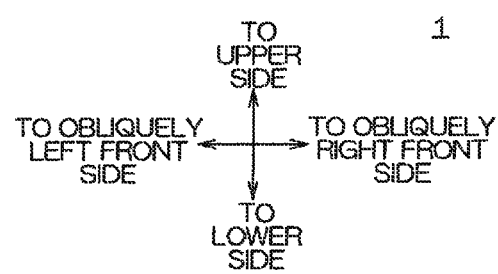

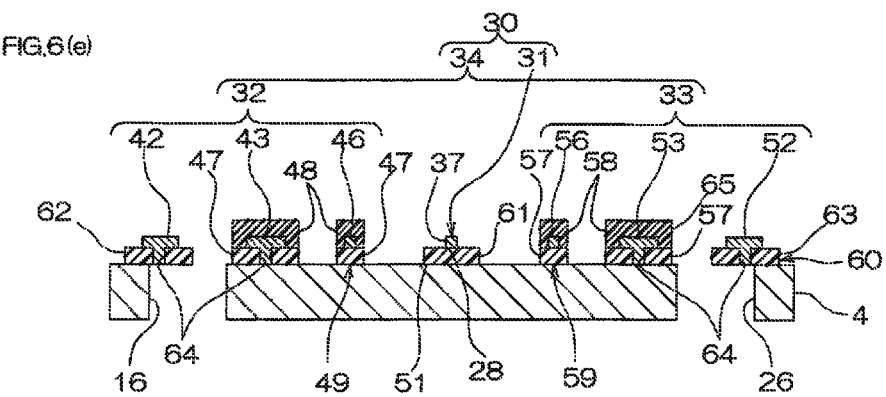
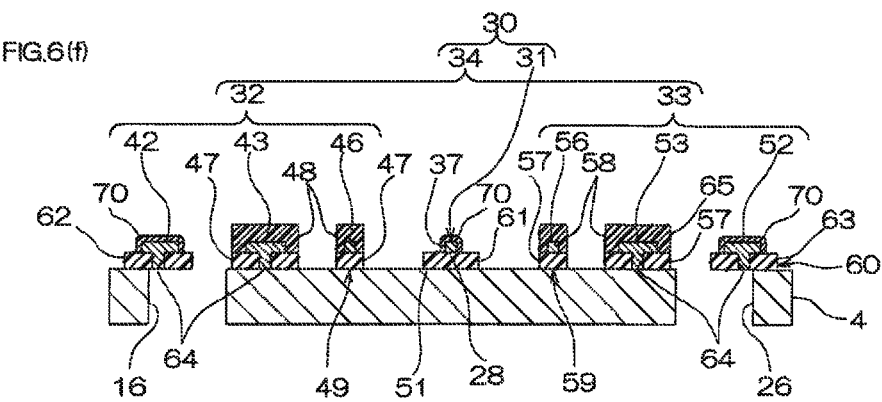
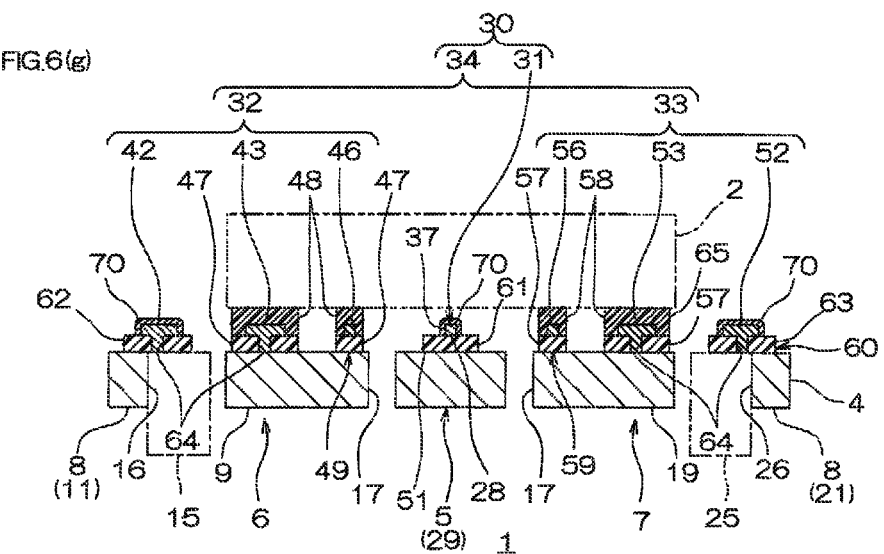

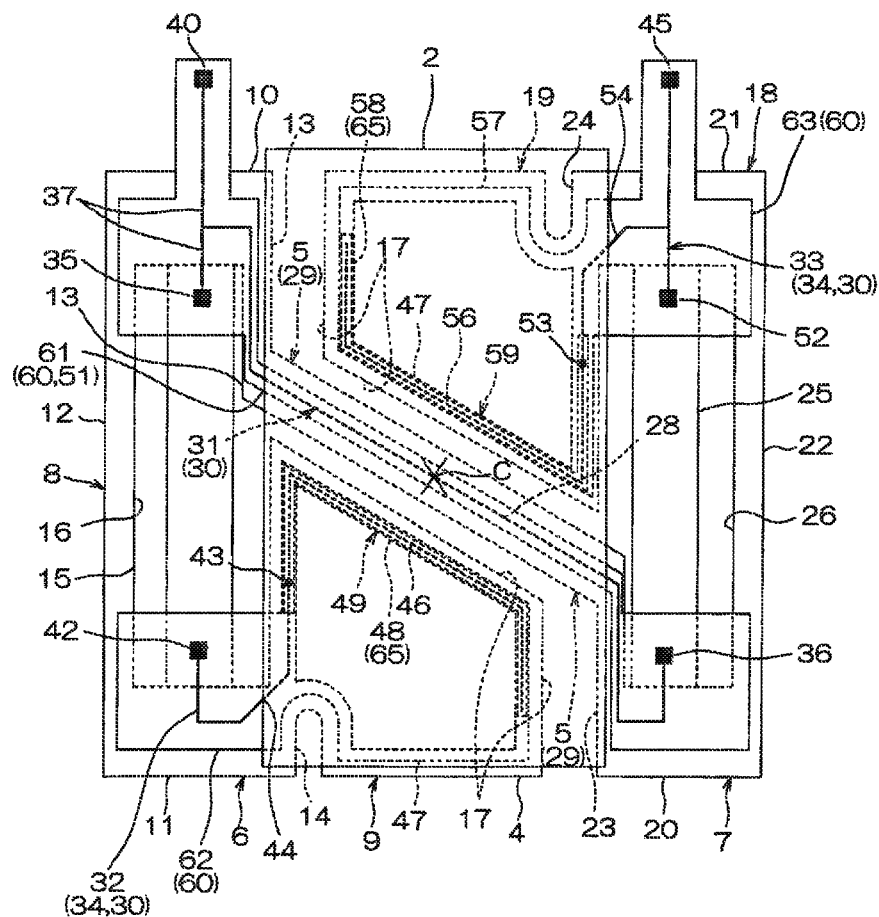
FIG.8
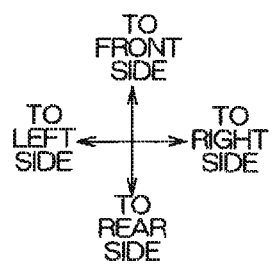

SUSPENSION BOARD WITH CIRCUIT

CROSS-REFERENCE TO RELATED APPLICATION

The present application claims priority from Japanese Patent Application No. 2012-270507 filed on Dec. 11, 2012, the content of which is herein incorporated by reference into this application.

BACKGROUND OF THE INVENTION

1. Field of the Invention

The present invention relates to a suspension board with circuit, and particularly to a suspension board with circuit used in a hard disk drive.

2. Description of the Related Art

Conventionally, it has been known to provide a suspension board with circuit on which a magnetic head is mounted with a microactuator so as to precisely and finely adjust the position of the magnetic head.

For example, a head gimbal assembly has been proposed which includes a tongue portion having a stage and formed with a trace, a head slider fixed to the stage, and piezoelectric elements provided in the tongue portion to rotatably support the stage (see, e.g., Japanese Unexamined Patent No. 2010-146631).

In the head gimbal assembly of Japanese Unexamined Patent No. 2010-146631, by the extending/contracting operation of the piezoelectric elements, the stage and the head slider are rotated. On the other hand, the trace is routed so as to take a detour around the end portion of the head slider during the rotation thereof.

SUMMARY OF THE INVENTION

There is a demand for placing the trace such that the trace overlaps the head slider in a thickness direction so as to reduce the size of the suspension board with circuit and increase the density of the trace.

However, when the trace is placed so as to overlap the head slider in the thickness direction, the problem is encountered that the head slider comes in sliding contact with the trace during the rotation of the head slider to damage the trace.

It is therefore an object of the present invention to provide a suspension board with circuit on which a slider can be mounted to be relatively movable with respect to a conductive overlapping portion and which also allows prevention of damage to the conductive overlapping portion, while being reduced in size and achieving an increase in the density of a conductive layer.

A suspension board with circuit of the present invention includes a metal supporting layer, an insulating base layer formed on the metal supporting layer, a conductive layer formed on the insulating base layer, and a slider supported on the metal supporting layer via a pedestal, wherein the conductive layer includes a conductive overlapping portion which overlaps a plane on which the slider is projected when projected in a thickness direction, and the conductive overlapping portion is provided to be spaced apart from the slider.

In the suspension board with circuit, the conductive layer includes the conductive overlapping portion which overlaps the plane on which the slider is projected when projected in the thickness direction. This allows a reduction in the size of the suspension board with circuit and an increase in the density of the conductive layer.

In addition, since the conductive overlapping portion is provided to be spaced apart from the slider, even when the slider moves relative to the conductive overlapping portion, it is possible to prevent damage resulting from the contact of the conductive overlapping portion with the slider.

It is preferable that the suspension board with circuit of the present invention further includes an insulating cover layer formed on the insulating base layer so as to cover the conductive layer, and the pedestal includes a pedestal base layer included in the insulating base layer, a pedestal conductive layer included in the conductive layer and formed on the pedestal base layer, and a pedestal cover layer included in the insulating cover layer and formed on the pedestal base layer so as to cover the pedestal conductive layer.

In the suspension board with circuit, the slider is mounted on the pedestal including the pedestal base layer, the pedestal conductive layer, and the pedestal cover layer. This can ensure a space provided between the conductive overlapping portion and the slider.

In addition, in the suspension board with circuit, the pedestal base layer is included in the insulating base layer, the pedestal conductive layer is included in the conductive layer, and the pedestal cover layer is included in the insulating cover layer. This allows the pedestal including the pedestal base layer, the pedestal conductive layer, and the pedestal cover layer to be formed simultaneously together with the insulating base layer, the conductive layer, and the insulating cover layer. Therefore, it is possible to simplify the configuration of the layers in the suspension board with circuit including the pedestal.

It is preferable that the suspension board with circuit of the present invention further includes a piezoelectric element electrically connected to the conductive layer, and the metal supporting layer is configured to cause the slider to operate in association with the piezoelectric element based on extension/contraction thereof.

In the suspension board with circuit, the metal supporting layer is configured so as to cause the slider to operate in association with the piezoelectric element based on the extension/contraction thereof and thereby allow the slider to move. Therefore, it is possible to precisely adjust the position of a magnetic head mounted on the slider.

In the suspension board with circuit of the present invention, it is preferable that a plurality of the piezoelectric elements are provided to be spaced apart from each other such that the slider is interposed therebetween when projected in the thickness direction, the conductive layer includes a wire connecting the plurality of piezoelectric elements, and the wire includes the conductive overlapping portion.

In the suspension board with circuit, the wire including the conductive overlapping portion can connect the plurality of piezoelectric elements, while being effectively prevented from contact with the slider. In addition, since the plurality of piezoelectric elements are provided to be spaced apart from each other such that the slider is interposed therebetween, the slider can be efficiently moved.

In addition, since the wire includes the conductive overlapping portion which overlaps the plane on which the slider is projected, it is possible to increase the density of the wire and consequently compactize the suspension board with circuit.

In the suspension board with circuit of the present invention, it is preferable that the conductive layer includes a terminal electrically connected to the piezoelectric element, and the terminal and the pedestal are arranged to be spaced apart from each other.

In the suspension board with circuit, the terminal and the pedestal are arranged to be spaced apart from each other. Therefore, it is possible to effectively prevent contact between the slider supported on the pedestal and the terminal and effectively prevent damage to the terminal resulting therefrom.

In the suspension board with circuit of the present invention, it is preferable that the insulating base layer includes a base overlapping portion which overlaps the plane on which the slider is projected when projected in the thickness direction to support the conductive overlapping portion, and the base overlapping portion is formed to have a thickness smaller than a thickness of the portion of the insulating base layer other than the base overlapping portion.

In the suspension board with circuit, the base overlapping portion is formed to have the thickness smaller than the thickness of the portion of the insulating base layer other than the base overlapping portion. This can ensure a sufficient space between the conductive overlapping portion and the slider.

In the suspension board with circuit of the present invention, it is preferable that the pedestal is formed to have a thickness larger than the thickness of the conductive overlapping portion and/or the insulating overlapping portion.

In the suspension board with circuit, the pedestal is formed to have the thickness larger than the thickness of the conductive overlapping portion and/or the insulating overlapping portion. This can ensure a sufficient space between the conductive overlapping portion and the slider.

In the suspension board with circuit of the present invention, it is preferable that the metal supporting layer includes a support overlapping portion which overlaps the plane on which the slider is projected when projected in the thickness direction to support the conductive overlapping portion, and the support overlapping portion is formed to have a thickness smaller than a thickness of the portion of the metal supporting layer other than the support overlapping portion.

In the suspension board with circuit, the support overlapping portion is formed to have the thickness smaller than the thickness of the portion of the metal supporting layer other than the support overlapping portion. This can ensure a sufficient space between the conductive overlapping portion and the slider.

BRIEF DESCRIPTION OF THE DRAWINGS

FIG. 1 shows a plan view of a first suspension board with circuit as a first embodiment of a suspension board with circuit of the present invention;

FIG. 4 shows a cross-sectional view of the first suspension board with circuit shown in FIG. 1, which is taken along the line B-B;

FIGS. 6(e)-6(g) are a production process view of the first suspension board with circuit shown in FIG. 4, which is subsequent to FIGS. 5(a)-5(d), FIG. 6(e) showing the step of forming accommodation spaces, FIG. 6(f) showing the step of forming a metal protective layer, and FIG. 6(g) showing the step of forming slits in the metal supporting layer;

FIG. 8 shows an enlarged plan view of the first suspension board with circuit in the head gimbal assembly shown in FIG. 7;

DETAILED DESCRIPTION OF THE INVENTION

<First Embodiment>

It is assumed that a vertical direction of paper with FIG. 1 is a "front-rear direction" (first direction), a left-right direction of the paper with FIG. 1 is a "left-right direction" (second direction), and a direction along the thickness of the paper with FIG. 1 is an "up-down direction" (third direction or thickness direction). The directions in each of the drawings including and subsequent to FIG. 2 are based on the directions in FIG. 1.

Figure 2:
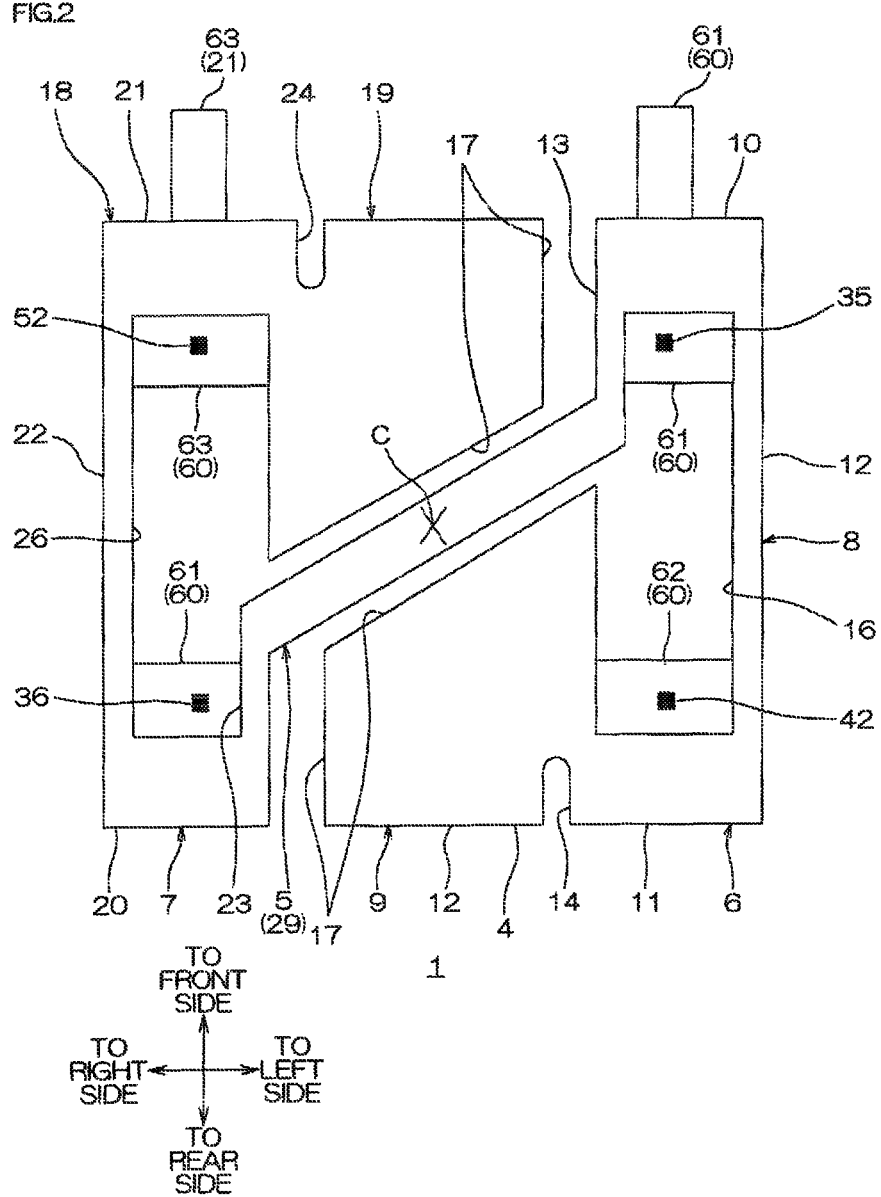
FIG. 2 shows a bottom view of the first suspension board with circuit shown in FIG. 1.

As shown in FIGS. 1 and 2, a first suspension board with circuit 1 as a first embodiment of a suspension board with circuit of the present invention has a short generally rectangular flat plate shape in plan view. Specifically, the first suspension board with circuit 1 has a generally Z-shaped shape in plan view (see FIG. 1) or a generally S-shaped shape in bottom view (see FIG. 2). With a slider 2 (see FIG. 3) described later being mounted thereon, the first suspension board with circuit 1 is mounted on a long second suspension board with circuit 3 (FIG. 7) described later and then mounted in a hard disk drive.

As shown in FIG. 1, the first suspension board with circuit 1 includes a metal supporting layer 4, and a conductive layer 30 supported on the metal supporting layer 4.

As shown in FIGS. 1 and 2, the metal supporting layer 4 forms the outer shape of the first suspension board with circuit 1 in plan view. Specifically, the metal supporting layer 4 integrally includes a base portion 5 extending in one direction, a first movable portion 6, and a second movable portion 7 which are respectively continued to the both end portions of the base portion 5.

The base portion 5 has a narrow generally rectangular shape in plan view. Specifically, the base portion 5 is formed in a linear shape gradually inclined frontwardly in a leftward direction.

The first movable portion 6 integrally includes a first piezoelectric element mounting portion 8 connected to the left end portion of the base portion 5, and a first slider mounting portion 9 continued to the first piezoelectric element mounting portion 8.

The first piezoelectric element mounting portion 8 is formed in a generally U-shaped (or C-shaped) shape which is rightwardly (inwardly) opened. The first piezoelectric element mounting portion 8 integrally includes a first front supporting portion 10 and a first rear supporting portion 11 which are disposed to be spaced apart from each other in the front-rear direction in facing relation, a first outer connecting portion 12 which connects the first front supporting portion 10 and the first rear supporting portion 11, and a first inner connecting portion 13 which connects the first front supporting portion 10 and the base portion 5.

Each of the first front supporting portion 10 and the first rear supporting portion 11 is formed in a generally rectangular shape in plan view which is slightly longer in the left-right direction. The first front supporting portion 10 and the first rear supporting portion 11 are respectively disposed in the front end portion and the rear end portion of the first movable portion 6.

The first outer connecting portion 12 is formed in a narrow generally rectangular shape in plan view which is longer in the front-rear direction so as to connect the left end portion of the first front supporting portion 10 and the left end portion of the first rear supporting portion 11.

The first inner connecting portion 13 is formed in a generally rectangular shape which rearwardly extends from the right end portion of the first front supporting portion 10. The first inner connecting portion 13 connects the first front supporting portion 10 and the base portion 5. The length of the first inner connecting portion 13 in the front-rear direction is set shorter than that of the first outer connecting portion 12.

The first slider mounting portion 9 is formed in a flat plate shape which frontwardly protrudes, while rightwardly extending from the right end portion of the first rear supporting portion 11. Specifically, the first slider mounting portion 9 is formed in a generally trapezoidal shape in plan view having a length thereof in the front-rear direction which is longer than that of the first rear supporting portion 11. More specifically, the first slider mounting portion 9 has the outer shape thereof formed of right and left sides parallel with each other and front and rear sides which connect the front and rear end portions thereof. The first slider mounting portion 9 is formed such that each of the right and left sides and the rear side are perpendicular to each other, while the front side is gradually inclined rearwardly in a rightward direction. The rear side of the first slider mounting portion 9 is formed flush with the rear end edge of the first rear supporting portion 11.

The first slider mounting portion 9 is provided on the rear side of the base portion 5 to be spaced apart therefrom via slits 17. The front portion of the first slider mounting portion 9 is provided on the right side of the first outer connecting portion 12 via a first accommodation space 16 described later. Also, the first slider mounting portion 9 is provided on the left side of a second rear supporting portion 20 of the second movable portion 7 and a second inner connecting portion 23 thereof each described later via the slits 17. That is, of the first slider mounting portion 9, only the left end portion of the rear portion thereof is continued to the first rear supporting portion 11.

The slits 17 are formed so as to extend through the metal supporting layer 4 in the thickness direction thereof.

Note that, in the rear end portion of the boundary portion between the first rear supporting portion 11 and the first slider mounting portion 9, a first notched portion 14 is formed from the rear end surface toward the front side. The first notched portion 14 partitions off the first rear supporting portion 11 from the first slider mounting portion 9.

In addition, the rear surface of the first front supporting portion 10 of the first piezoelectric element mounting portion 8, the front surface of the first rear supporting portion 11 thereof, the right surface of the first outer connecting portion 12 thereof, the left surface of the first inner connecting portion 13 thereof, and the left surface of the front portion of the first slider mounting portion 9 form the first accommodation space 16 in which a first piezoelectric element 15 described later is to be accommodated.

The first accommodation space 16 is formed in a generally rectangular shape in plan view extending in the front-rear direction so as to extend through the metal supporting layer 4 in the thickness direction, while being communicated with the slits 17. That is, the base portion 5, the first rear supporting portion 11 of the first piezoelectric element mounting portion 8, and the first slider mounting portion 9 are spaced apart from each other via the first accommodation space 16 and the slits 17.

The second movable portion 7 is connected to the right end portion of the base portion 5 and formed point-symmetrically to the first movable portion 6 with respect to the center portion C of the base portion 5. That is, the second movable portion 7 includes a second piezoelectric element mounting portion 18 and a second slider mounting portion 19. The second piezoelectric element mounting portion 18 includes a second rear supporting portion 20, a second front supporting portion 21, a second outer connecting portion 22, and a second inner connection portion 23. In the boundary portion between the second front supporting portion 21 and the second slider mounting portion 19, a second notched portion 24 is formed. In addition, the front surface of the second rear supporting portion 20, the rear surface of the second front supporting portion 21, the left surface of the second outer connecting portion 22, the right surface of the second inner connecting portion 23, and the right surface of the rear portion of the second slider mounting portion 19 form a second accommodation space 26 in which a second piezoelectric element 25 (see FIG. 8) described later is to be accommodated.

Note that the second slider mounting portion 19 is disposed to be rightwardly shifted from the first slider mounting portion 9 when projected in the front-rear direction. Accordingly, as shown in FIG. 8, the slider 2 is configured to operate in association with the first and second piezoelectric elements 15 and 25 based on the extension/contraction thereof when the slider 2 is mounted over the first and second slider mounting portions 9 and 19 to extend therebetween along the front-rear direction, and then the first and second piezoelectric elements 15 and 25 are respectively accommodated in the first and second accommodation spaces 16 and 26 and caused to extend/contract. The operation of the slider 2 in association with the first and second piezoelectric elements 15 and 25 is described later.

As shown in FIG. 1, the conductive layer 30 includes a power source pattern 31 and a ground pattern 34 which are independent of each other.

The power source pattern 31 is provided extensively over the base portion 5, the first movable portion 6, and the second movable portion 7. Specifically, the power source pattern 31 integrally includes a first piezoelectric-element-side power source terminal 35, a second piezoelectric-element-side power source terminal 36, and a first power source wire 37 electrically connecting the first piezoelectric-element-side power source terminal 35 and the second piezoelectric-element-side power source terminal 36.

As shown in FIGS. 1 and 2, the first piezoelectric-element-side power source terminal 35 is disposed on the rear side of the first front supporting portion 10 to be spaced apart therefrom, and is specifically formed on a first base layer 61 (described later) covering the front end portion of the first accommodation space 16. To the first piezoelectric-element-side power source terminal 35, the first piezoelectric element 15 (see FIG. 8) described later is electrically connected.

The second piezoelectric-element-side power source terminal 36 is disposed on the front side of the second rear supporting portion 20 to be spaced apart therefrom. Specifically, the second piezoelectric-element-side power source terminal 36 is formed on the first base layer 61 (described later) covering the rear end portion of the second accommodation space 26. To the second piezoelectric-element-side power source terminal 36, the first piezoelectric element 15 (see FIG. 8) described later is electrically connected.

As shown in FIG. 1, the first power source wire 37 is placed in a generally inverted-S-shaped configuration in plan view over the first front supporting portion 10, the base portion 5, and the second rear supporting portion 20 and routed so as to electrically connect the first piezoelectric-element-side power source terminal 35 and the second piezoelectric-element-side power source terminal 36. Specifically, the first power source wire 37 extends frontwardly from the front end portion of the first piezoelectric-element-side power source terminal 35 and then reaches the first front supporting portion 10 to be subsequently turned back rearwardly. That is, the first power source wire 37 is bent rightwardly in the first front supporting portion 10 and subsequently bent rearwardly. Then, the first power source wire 37 extends rearwardly in the first inner connecting portion 13 and subsequently extends inclinedly along the base portion 5. Thereafter, the first power source wire 37 extends rearwardly in the second inner connecting portion 23 and is then turned back frontwardly in the second rear supporting portion 20. That is, the first power source wire 37 is bent rightwardly in the second rear supporting portion 20 and subsequently bent frontwardly. Thereafter, the first power source wire 37 reaches the rear end portion of the second piezoelectric-element-side power source terminal 36.

Also, as shown in FIG. 8, the first power source wire 37 in the base portion 5 forms a conductive overlapping portion 28 which overlaps a plane on which the slider 2 is projected when projected in the thickness direction upon mounting of the slider 2 described later on the first suspension board with circuit 1.

The base portion 5 forms a support overlapping portion 29 which overlaps the plane on which the slider 2 is projected when projected in the thickness direction and supports the conductive overlapping portion 28.

As shown in FIG. 1, the power source pattern 31 also includes a first circuit-side power source terminal 40. To the first circuit-side power source terminal 40, the first power source wire 37 which is branched in the first front supporting portion 10 is electrically connected. To the first circuit-side power source terminal 40, a second circuit-side power source terminal 76 (see FIG. 7) of the second suspension board with circuit 3 described later is electrically connected.

The ground pattern 34 includes a first ground pattern 32 and a second ground pattern 33 which are provided independently of each other.

The first ground pattern 32 is provided extensively over the first rear supporting portion 11 and the first slider mounting portion 9. Specifically, the first ground pattern 32 integrally includes a first piezoelectric-element-side ground terminal 42, a first ground portion 43, and a first ground wire 44 electrically connecting the first piezoelectric-element-side ground terminal 42 and the first ground portion 43.

The first piezoelectric-element-side ground terminal 42 is disposed on the front side of the first rear supporting portion 11 of the first piezoelectric element mounting portion 8 to be spaced apart therefrom. Specifically, the first piezoelectric-element-side ground terminal 42 is formed on a second base layer 62 (described later) covering the rear end portion of the first accommodation space 16. To the first piezoelectric-element-side ground terminal 42, the first piezoelectric element 15 (see FIG. 8) described later is electrically connected.

The first ground portion 43 is provided at a middle point in the left end portion of the first slider mounting portion 9 in the front-rear direction. The first ground portion 43 is grounded to the first slider mounting portion 9.

The first ground wire 44 is specifically routed in a generally U-shaped shape which is frontwardly opened over the first rear supporting portion 11 and the first slider mounting portion 9 so as to electrically connect the first piezoelectric-element-side terminal 42 and the first ground portion 43. More specifically, the first ground wire 4 extends rearwardly from the rear end portion of the first piezoelectric-element-side terminal 42 and then reaches the first rear supporting portion 11 to be subsequently turned back frontwardly. That is, the first ground wire 44 is bent rightwardly in the first rear supporting portion 11 and then bent frontwardly. Subsequently, the first ground wire 44 extends frontwardly, while approaching the front side of the first notched portion 14, and reaches the rear end portion of the first ground portion 43.

The first ground pattern 32 also includes a first pedestal conductive layer 46 as a pedestal conductive layer extending continuously from the first ground portion 43.

The first pedestal conductive layer 46 is provided on a first pedestal base layer 47 described later into a shape narrower than the first ground portion 43. Specifically, the first pedestal conductive layer 46 is formed in a generally U-shaped shape in plan view which is rearwardly opened over the front end portion of the first slider mounting portion 9, the front portion of the left end portion thereof, and the front portion of the right end portion thereof. More specifically, the first pedestal conductive layer 46 is formed to extend frontwardly from the front end portion of the first ground portion 43 to be subsequently bent rightwardly in the front end portion of the first slider mounting portion 9. Then, the first pedestal conductive layer 46 extends inclinedly along the front side to subsequently reach the right end portion of the first slider mounting portion 9 and then extend rearwardly.

The second ground pattern 33 is formed point-symmetrically to the first ground pattern 32 with respect to the center portion C of the base portion 5 except for the portion thereof including a first circuit-side ground terminal 45. That is, the second ground pattern 33 includes a second piezoelectric-element-side ground terminal 52, a second ground portion 53, and a second ground wire 54. The second ground pattern 33 also includes a second pedestal conductive layer 56 as a pedestal conductive layer extending continuously from the second ground portion 53.

To the first circuit-side ground terminal 45, the second ground wire 54 branched in the second front supporting portion 21 is electrically connected.

Figure 3:
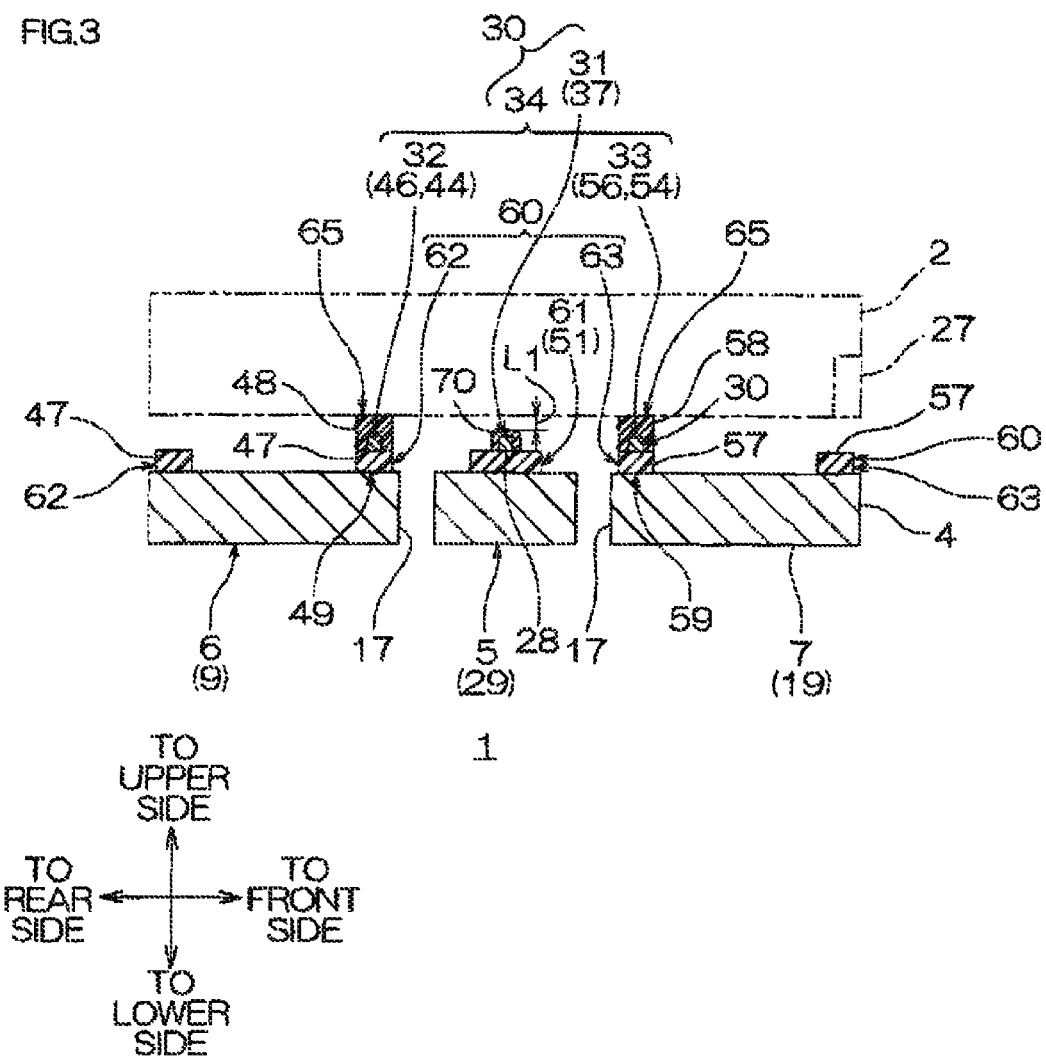
FIG. 3 shows a cross-sectional view of the first suspension board with circuit shown in FIG. 1, which is taken along the line A-A.

As shown in FIGS. 3 and 4, the first suspension board with circuit 1 includes the metal supporting layer 4, an insulating base layer 60 formed on the metal supporting layer 4, the conductive layer 30 formed on the insulating base layer 60, an insulating cover layer 65 formed on the insulating base layer 60 so as to cover the conductive layer 30, and a metal protective layer 70 covering the conductive layer 30.

The metal supporting layer 4 is formed into the foregoing shape formed with the first accommodation space 16, the second accommodation space 26, and the plurality of slits 17. The metal supporting layer 4 is formed of a metal material (conductive material) such as, e.g., stainless steel, a 42-alloy, aluminum, a copper-beryllium alloy, or phosphor bronze. Preferably, the metal supporting layer 4 is formed of stainless steel. The thickness of the metal supporting layer 4 is in a range of, e.g., not less than 10 µm, or preferably not less than 15 µm and, e.g., not more than 150 µm, or preferably not more than 100 µm.

The insulating base layer 60 is provided over the base portion 5, the first movable portion 6, and the second movable portion 7. Specifically, as shown in FIG. 1, the insulating base layer 60 includes the first base layer 61, the second base layer 62, and a third base layer 63 which are independent of each other.

On the upper surface of the metal supporting layer 4, the first base layer 61 is formed continuously over the base portion 5, the first inner connecting portion 13, the first front supporting portion 10, the second inner connecting portion 23, and the second rear supporting portion 20.

In the base portion 5, the portion of the first base layer 61 corresponding to (supporting) the first power source wire 37 described above forms a base overlapping portion 51.

The first base layer 61 is formed to further extend frontwardly and rearwardly from the first front supporting portion 10. Note that the portion of the first base layer 61 extending rearwardly from the first front supporting portion 10 and covering the front end portion of the first accommodation space 16 has a base opening (not shown in FIG. 1) formed to extend through the insulating base layer 60 in the thickness direction thereof.

The first base layer 61 is also formed to extend frontwardly from the second rear supporting portion 20. The portion of the first base layer 61 extending frontwardly from the second rear supporting portion 20 and covering the rear end portion of the second accommodation space 26 has a base opening (not shown) formed to extend through the insulating base layer 60 in the thickness direction thereof.

On the upper surface of the metal supporting layer 4, the second base layer 62 is formed continuously over the first rear supporting portion 11 and the first slider mounting portion 9.

The second base layer 62 is formed to extend frontwardly from the first rear supporting portion 11. Also, as shown in FIG. 4, the second base layer 62 extending frontwardly from the first rear supporting portion 11 covers the rear end portion of the first accommodation space 16. Such a second base layer 62 has a base opening 64 formed to extend through the insulating base layer 60 in the thickness direction.

In the first slider mounting portion 9, the second base layer 62 is also formed in a generally frame trapezoidal shape in plan view extending along the peripheral end portion thereof. That is, the second base layer 62 is formed in a pattern exposing the center portion of the first slider mounting portion 9 in plan view. Note that, when the slider 2 is mounted on the first slider mounting portion 9, the second base layer 62 in the first slider mounting portion 9 supports the slider 2. Therefore, the second base layer 62 in the first slider mounting portion 9 forms the first pedestal base layer 47. Also, as shown in FIG. 4, the second base layer 62 corresponding to the first ground portion 43 in the first slider mounting portion 9 has the base opening 64 formed to extend through the insulating base layer 60 in the thickness direction thereof. Further, the first pedestal base layer 47 in the first slider mounting portion 9 has a frame shape in plan view. Therefore, as described later, the first pedestal base layer 47 in the first slider mounting portion 9 forms a dam portion for an adhesive with which the inside thereof is to be filled together with the first pedestal conductive layer 46 and a first pedestal cover layer 48.

As shown in FIG. 1, on the upper surface of the metal supporting layer 4, the third base layer 63 is formed continuously over the second front supporting portion 21 and the second slider mounting portion 19. Also, the third base layer 63 is formed point-symmetrically to the second base layer 62 with respect to the center portion C of the base portion 5 except for the portion thereof extending frontwardly from the second front supporting portion 21. Also, the third base layer 63 in the second slider mounting portion 19 forms a second pedestal base layer 57.

The insulating base layer 60 is formed of an insulating material such as a synthetic resin such as, e.g., a polyimide resin, a polyamide imide resin, an acrylic resin, a polyether nitrile resin, a polyether sulfone resin, a polyethylene terephthalate resin, a polyethylene naphthalate resin, or a polyvinyl chloride resin. Preferably, the insulating base layer 60 is formed of a polyimide resin. The thickness of the insulating base layer 60 is in a range of, e.g., not less than 3 µm, or preferably not less than 4 µm and, e.g., not more than 17 µm, or preferably not more than 12 µm.

As shown in FIG. 1, the conductive layer 30 is formed as a conductive pattern including the power source pattern 31 and the ground pattern 34. The first piezoelectric-element-side power source terminal 35 includes a lower part thereof with which the base opening (not shown in FIG. 1) of the first base layer 61 covering the front end portion of the first accommodation space 16 is filled, and an upper part thereof which protrudes upwardly and outwardly from the lower part. As a result, the lower surface of the lower part of the first piezoelectric-element-side power source terminal 35 is formed flush with the lower surface of the first base layer 61, while being exposed downwardly from the first base layer 61. On the other hand, the second piezoelectric-element-side power source terminal 36 includes a lower part thereof with which the base opening 64 (not shown in FIG. 1) of the first base layer 61 is filled, and an upper part thereof which protrudes upwardly and outwardly from the lower part. As a result, the lower surface of the lower part of the second piezoelectric-element-side power source terminal 36 is formed flush with the lower surface of the first base layer 61, while being exposed at the lower surface from the first base layer 61.

As shown in FIG. 4, in the first ground pattern 32, the first piezoelectric-element-side ground terminal 42 includes a lower part thereof with which the base opening 64 formed in the second base layer 62 covering the rear end portion of the first accommodation space 16 is filled, and an upper part thereof protruding upwardly and outwardly from the lower part. As a result, the lower surface of the lower part of the first piezoelectric-element-side ground terminal 42 is formed flush with the lower surface of the second base layer 62, while being exposed downwardly from the second base layer 62. On the other hand, the first ground portion 43 also includes a lower part thereof with which the base opening 64 formed in the second base layer 62 formed in the first slider mounting portion 9 is filled, and an upper part thereof protruding upwardly and outwardly from the lower part. The lower surface of the lower part of the first ground portion 43 is in contact with the metal supporting layer 4. In this manner, the first ground portion 43 is grounded to the metal supporting layer 4.

In the second ground pattern 33, the second piezoelectric-element-side ground terminal 52 includes a lower part thereof with which the base opening 64 formed in the third base layer 63 covering the front end portion of the second accommodation space 26 is filled, and an upper part thereof protruding upwardly and outwardly from the lower part. As a result, the lower surface of the lower part of the second piezoelectric-element-side ground terminal 52 is formed flush with the lower surface of the third base layer 63, while being exposed downwardly from the third base layer 63.

The conductive layer 30 is formed of a conductive material such as, e.g., copper, nickel, gold, a solder, or an alloy thereof. Preferably, the conductive layer 30 is formed of copper.

The thickness of the conductive layer 30 (including the thicknesses of the respective upper parts of the first piezoelectric-element-side power source terminal 35, the first piezoelectric-element-side ground terminal 42, the second piezoelectric-element-side power source terminal 36, and the second piezoelectric-element-side ground terminal 52) is in a range of, e.g., not less than 3 µm, or preferably not less than 5 µm and, e.g., not more than 50 µm, or preferably not more than 20 µm.

The insulating cover layer 65 is formed to cover a part of the ground pattern 34 and includes the first pedestal cover layer 48 and a second pedestal cover layer 58.

The first pedestal cover layer 48 is a member shown by oblique hatching in FIG. 1, which is provided in the first slider mounting portion 9 and formed on the first pedestal base layer 47 into a pattern covering the first pedestal conductive layer 46 and the first ground portion 43, as shown in FIGS. 3 and 4. Specifically, the first pedestal cover layer 48 is formed over the respective side and upper surfaces of the first pedestal conductive layer 46 and the upper part of the first ground portion 43, while being formed on the upper surface of the first pedestal base layer 47 exposed from the first pedestal conductive layer 46 and the first ground portion 43. That is, as shown in FIG. 1, the first pedestal cover layer 48 is formed in a generally U-shaped pattern in plan view having the same width as that of the first pedestal base layer 47 and rearwardly opened.

Thus, as shown in FIGS. 3 and 4, in the first slider mounting portion 9, the laminated portion of the first pedestal base layer 47, the first pedestal conductive layer 46, and the first pedestal cover layer 48 forms a first pedestal 49 as a pedestal for supporting the slider 2 shown by the imaginary line in FIG. 3.

The thickness of the first pedestal 49 is larger than, e.g., the total thickness of the first base layer 61, the first power source wire 37, and the metal protective layer 70 (described later) in the base portion 5. Specifically, the thickness of the first pedestal 49 is in a range of, e.g., not less than 6 µm, or preferably not less than 10 µm and, e.g., not more than 70 µm, or preferably not more than 30 µm.

The second pedestal cover layer 58 is a member shown by oblique hatching in FIG. 1, which is provided in the second slider mounting portion 19 and formed point-symmetrically to the first pedestal cover layer 48 with respect to the center portion C of the base portion 5.

Thus, in the second slider mounting portion 19, the laminated portion of the second pedestal base layer 57, the second pedestal conductive layer 56, and the second pedestal cover layer 58 forms a second pedestal 59 as a pedestal for supporting the slider 2 shown by the imaginary line in FIG. 3.

The thickness of the insulating cover layer 65 is in a range of, e.g., not less than 1 µm, or preferably not less than 3 µm and, e.g., not more than 40 µm, or preferably not more than 10 µm. Note that the thickness of the insulating cover layer 65 corresponds to the distance between the upper surface of the insulating cover layer 65 and the upper surface of the insulating base layer 60.

The metal protective layer 70 is formed to cover the power source pattern 31 and the ground pattern 34 exposed from the insulating cover layer 65. That is, as shown in FIG. 4, the metal protective layer 70 is formed over the upper part of the first piezoelectric-element-side power source terminal 35 (see FIG. 1), the upper part of the second piezoelectric-element-side power source terminal 36 (see FIG. 1), and the side and upper surfaces of the first power source wire 37. The metal protective layer 70 is also formed over the upper part of the first piezoelectric-element-side ground terminal 42, the side and upper surfaces of the first ground wire 44 (see FIG. 1), the upper part of the second piezoelectric-element-side ground terminal 52, and the side and upper surfaces of the second ground wire 54 (see FIG. 1). Also, the metal protective layer 70 is formed over the upper and side surfaces of the first circuit-side power source terminal 40 and the upper and side surfaces of the first circuit-side ground terminal 45.

The metal protective layer 70 is formed of, e.g., nickel, chromium, an alloy (nichrome) of nickel and chromium, or the like. The thickness of the metal protective layer 70 is smaller than the thickness of the insulating cover layer 65. The thickness of the metal protective layer 70 is, e.g., not more than 10%, preferably not more than 5%, or more preferably not more than 1% of the thickness of the insulating cover layer 65 and, e.g., not less than 0.1% thereof. Specifically, the thickness of the metal protective layer 70 is in a range of, e.g., not more than 1 µm, preferably not more than 0.1 µm and, e.g., not less than 0.01 µm. When the thickness of the metal protective layer 70 exceeds the foregoing upper limits, the metal protective layer 70 in the power source pattern 31 in the base portion 5 described above may come in contact with the slider 2 (see FIGS. 3 and 4).

Next, a method of producing the first suspension board with circuit 1 is described with reference to FIGS. 5(a)-5(d) and 6(e)-6(g).

Figure 5A:
FIGS. 5(a)-5(d) are a production process view of the first suspension board with circuit shown in FIG. 4, FIG. 5(a) showing the step of preparing a metal supporting layer, FIG. 5(b) showing the step of forming an insulating base layer, FIG. 5(c) showing the step of forming a conductive layer, and FIG. 5(d) showing the step of forming an insulating cover layer.

As shown in FIG. 5(a), in the method, the metal supporting layer 4 having a flat plate shape is prepared first.

Figure 5B:
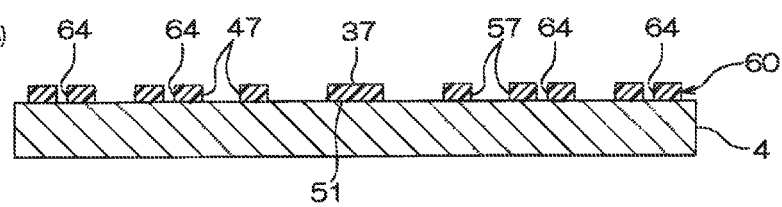

Then, in the method, as shown in FIG. 5(b), the insulating base layer 60 is formed in the foregoing pattern formed with the base opening 64 on the upper surface of the metal supporting layer 4. Note that the insulating base layer 60 is formed also on the upper surface of each of the portions of the metal supporting layer 4 corresponding to the front and rear end portions of the first accommodation space 16 (see FIG. 1) and to the front and rear end portions of the second accommodation space 26 (see FIG. 1).

Specifically, onto the entire upper surface of the metal supporting layer 4, a varnish of a photosensitive insulating material is applied and dried to form a coating. Then, the coating is exposed to light, developed, and cured by heating to form the insulating base layer 60 in the foregoing pattern. In this manner, the insulating base layer 60 including the first pedestal base layer 47 and the second pedestal base layer 57 is formed.

Figure 5C:
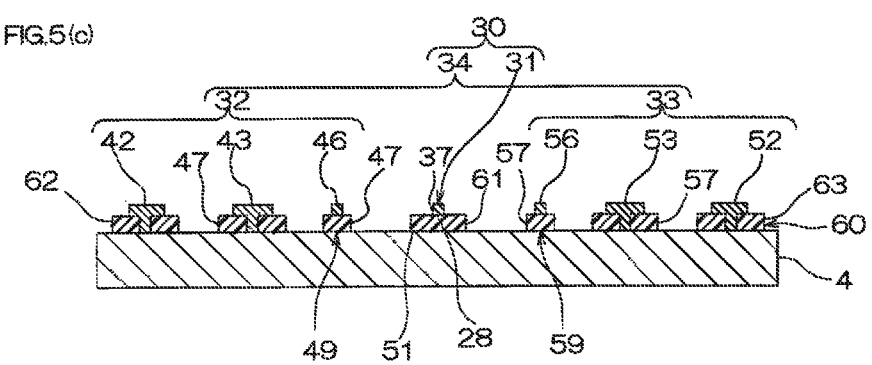

Next, in the method, as shown in FIG. 5(c), the conductive layer 30 is formed in the foregoing pattern over the metal supporting layer 4 and the insulating base layer 60 by an additive method, a subtractive method, or the like. Preferably, the conductive layer 30 is formed in the pattern including the power source pattern 31 and the ground pattern 34 (the first ground pattern 32 and the second ground pattern 33) by the additive method. In this manner, the conductive layer 30 including the first pedestal conductive layer 46 and the second pedestal conductive layer 56 is formed.

Figure 5D:
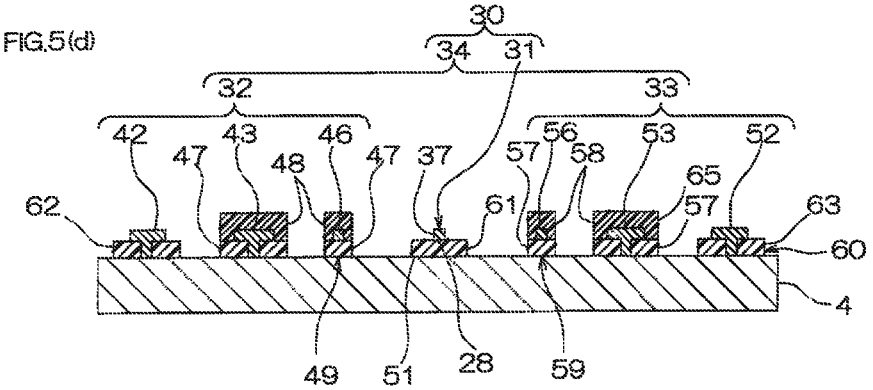

Next, in the method, as shown in FIG. 5(d), the insulating cover layer 65 is formed on the insulating base layer 60 so as to cover parts (the first pedestal conductive layer 46, the first ground portion 43, the second pedestal conductive layer 56, and the second ground portion 53) of the ground pattern 34.

Specifically, onto the entire upper surface of the metal supporting layer 4 including the conductive layer 30 and the insulating base layer 60, a varnish of a photosensitive insulating material is applied and dried to form a coating. Then, the coating is exposed to light, developed, and cured by heating to form the insulating cover layer 65 in the foregoing pattern. In this manner, the insulating cover layer 65 including the first pedestal cover layer 48 and the second pedestal cover layer 58 is formed.

Next, in the method, as shown in FIG. 6(e), the first accommodation space 16 and the second accommodation space 26 are formed in the metal supporting layer 4. Specifically, the first accommodation space 16 and the second accommodation space 26 are formed in the metal supporting layer 4 by, e.g., an etching method such as dry etching or wet etching (chemical etching), drilling perforation, laser processing, or the like. Preferably, the first accommodation space 16 and the second accommodation space 26 are formed in the metal supporting layer 4 by wet etching.

Next, in the method, as shown in FIG. 6(f), the metal protective layer 70 is formed over the respective side and upper surfaces of the power source pattern 31 and the ground pattern 34 exposed from the insulating cover layer 65. Specifically, the metal protective layer 70 is formed by, e.g., sputtering, electrolytic plating, or electroless plating. Preferably, the metal protective layer 70 is formed by electroless plating.

Next, in the method, as shown in FIG. 6(g), the slits 17 are formed in the metal supporting layer 4, while the metal supporting layer 4 is trimmed.

In this manner, the first suspension board with circuit 1 is produced.

Figure 7:
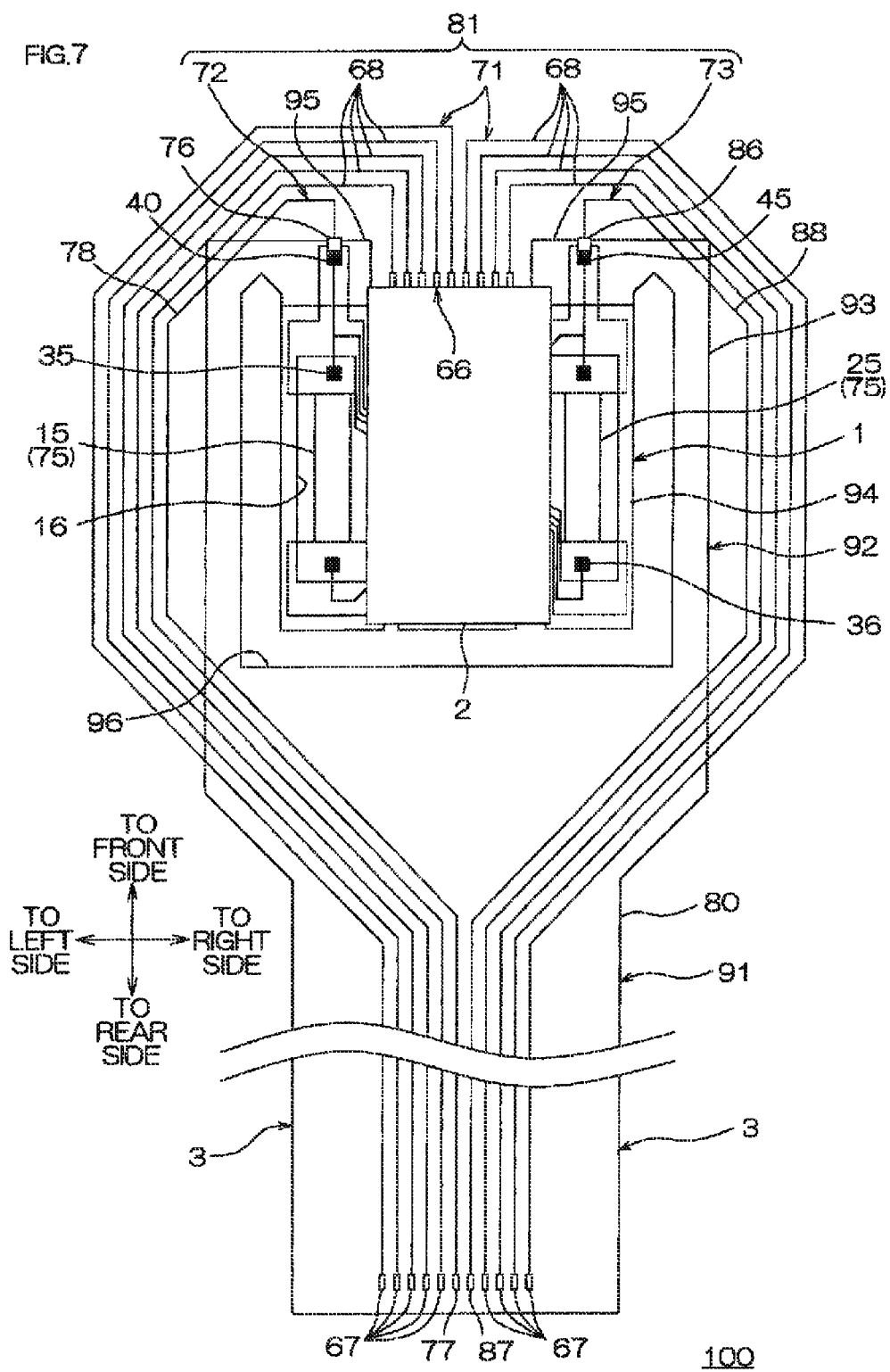
FIG. 7 shows a plan view of a head gimbal assembly including the first suspension board with circuit shown in FIG. 1.

Next, referring to FIGS. 7 and 8, a head gimbal assembly (HGA) 100 is described in which the first suspension board with circuit 1 is mounted on the second suspension board with circuit 3, and the slider 2 and the first piezoelectric element 15 are mounted on the first suspension board with circuit 1.

In FIG. 7, the insulating base layer and the insulating cover layer in the second suspension board with circuit 3, each described later, are omitted to clearly show the relative positioning of the metal supporting layer 4 and a metal supporting board 80.

As shown in FIG. 7, the head gimbal assembly 100 integrally includes the second suspension board with circuit 3, the first suspension board with circuit 1 mounted on the second suspension board with circuit 3, and the slider 2 mounted on the first suspension board with circuit 1.

The second suspension board with circuit 3 is formed in a flat plate shape extending long in the front-rear direction and includes the metal supporting board 80, and a conductive pattern 81 supported on the metal supporting board 80.

The metal supporting board 80 forms the outer shape of the second suspension board with circuit 3 and includes a wiring portion 91 and a mounting portion 92 continued to the wiring portion 91.

The wiring portion 91 is formed in a generally rectangular flat plate shape in plan view elongated in the front-rear direction.

The mounting portion 92 is formed in a generally rectangular flat plate shape in plan view protruding outwardly from the front end portion of the wiring portion 91 on both sides in the left-right direction.

The mounting portion 92 integrally includes an outrigger portion 93 which protrudes outwardly from the wiring portion 91 on both sides in the left-right direction when projected in the front-rear direction, a mounting region 94 formed internally of the outrigger portion 93, and connecting portions 95 connecting the respective front end portions thereof.

The outrigger portion 93 is a region having a generally rectangular shape in plan view extending in the front-rear direction.

The mounting region 94 is a region having a generally rectangular shape in plan view and disposed at the middle of the mounting portion 92 in each of the widthwise direction and the front-rear direction. The mounting region 94 also has the same shape as that of the metal supporting layer 4 of the first suspension board with circuit 1 in plan view.

The two connecting portions 95 are provided to be spaced apart from each other in the left-right direction. Each of the connecting portions 95 is a region having a generally rectangular shape extending in the left-right direction.

Note that, in the mounting portion 92, a support opening 96 having a generally U-shaped shape in plan view which is frontwardly opened is formed so as to extend through the metal supporting board 80 in the thickness direction. The support opening 96 partitions off the outrigger portion 93 and the mounting region 94 in the left-right direction.

The conductive pattern 81 includes a first pattern 71, a second pattern 72, and a third pattern 73 which are independent of each other.

The first pattern 71 integrally includes head-side terminals 66, external terminals 67, and signal wires 68 electrically connecting the head-side terminals 66 and the external terminals 67.

The plurality of head-side terminals 66 are disposed on the front side of the mounting region 94 to be spaced apart from each other in the left-right direction. The head-side terminals 66 are electrically connected to a magnetic head 27 (see FIG. 3) mounted on the front end portion of the slider 2 shown by the imaginary line of FIG. 3.

On the other hand, the plurality of external terminals 67 are disposed in the rear end portion of the wiring portion 91 to be spaced apart from each other in the left-right direction. To the external terminals 67, an external circuit board (not shown) such as a read/write board not shown is connected.

The signal wires 68 are differential signal wires. In the wiring portion 91, the plurality of signal wires 68 are provided along the front-rear direction and arranged in parallel to be spaced apart from each other in the widthwise direction. The signal wires 68 are also routed so as to be outwardly (outwardly on both sides in the left-right direction) bent from the front end portion of the wiring portion 91 to the mounting portion 92 and extend frontwardly on both outsides of the outrigger portion 93 in the left-right direction in parallel with the outrigger portion 93. After being inwardly bent in the connecting portions 95, the signal wires 68 are turned back on the front side of the connecting portion 95.

The second pattern 72 integrally includes the second circuit-side power source terminal 76, a supply-side power source terminal 77, and a second power source wire 78.

The second circuit-side power source terminal 76 is provided in the left-side connecting portion 95.

The supply-side power source terminal 77 is provided on the rear end portion of the wiring portion 91 and disposed internally of the external terminals 67 to be spaced apart therefrom. To the supply-side power source terminal 77, a power source (not shown) is connected.

The second power source wire 78 is provided internally of the signal wires 68 in parallel relation thereto over the wiring portion 91 and the mounting portion 92. Specifically, the second power source wire 78 is located to extend along the front-rear direction. The second power source wire 78 is routed so as to electrically connect the second circuit-side power source terminal 76 and the supply-side power source terminal 77.

The third pattern 73 integrally includes a second circuit-side ground terminal 86, a supply-side ground terminal 87, and a supply-side ground wire 88.

The second circuit-side ground terminal 86 is provided in the right-side connecting portion 95.

The supply-side ground terminal 87 is provided on the rear end portion of the wiring portion 91. The supply-side ground terminal 87 is disposed internally of the external terminals 67 and the supply-side power source terminal 77 to be spaced apart therefrom.

The supply-side ground wire 88 is provided internally of the right-side signal wire 68 in parallel relation thereto over the wiring portion 91 and the mounting portion 92. Specifically, the supply-side ground wire 88 is disposed to extend along the front-rear direction.

The supply-side ground wire 88 is routed so as to electrically connect the second circuit-side ground terminal 86 and the supply-side ground terminal 87.

The second suspension board with circuit 3 is also provided with a second insulating base layer interposed between the metal supporting board 80 and the conductive pattern 81 in the thickness direction and a second insulating cover layer covering the upper and side surfaces of the conductive pattern 81, though not shown in FIGS. 7 and 8.

In the second suspension board with circuit 3, the second insulating base layer not shown is provided on the lower surface of the conductive pattern 81 so as to correspond to the conductive pattern 81.

In the second suspension board with circuit 3, the second insulating cover layer not shown is formed in a pattern covering the signal wires 68 and exposing the head-side terminals 66 and the external terminals 67 in the first pattern 71, as shown in FIG. 7. The second insulating cover layer not shown is also formed in a pattern covering the second power source wire 78 and exposing the second circuit-side power source terminal 76 and the supply-side power source terminal 77 in the second pattern 72. The second insulating cover layer not shown is also formed in the pattern covering the supply-side ground wire 88 and exposing the second circuit-side ground terminal 86 and the supply-side ground terminal 87 in the third pattern 73.

The first suspension board with circuit 1 is mounted on the mounting region 94. Specifically, the first suspension board with circuit 1 is mounted on the mounting region 94 so as to overlap the mounting region 94 in the thickness direction.

On the first suspension board with circuit 1 of the head gimbal assembly 100, the slider 2, the first piezoelectric element 15, and the second piezoelectric element 25 are mounted.

As shown in FIG. 8, the slider 2 is mounted over the first slider mounting portion 9 and the second slider mounting portion 19 so as to overlap the base portion 5, the first slider mounting portion 9, and the second slider mounting portion 19 of the first suspension board with circuit 1. Specifically, the slider 2 has a generally rectangular flat plate shape in plan view extending in the front-rear direction and is placed over the first pedestal 49 and the second pedestal 59. Specifically, as shown in FIGS. 3 and 4, the lower surface of the slider 2 is supported on the first pedestal 49 and the second pedestal 59 so as to come in contact with the respective upper surfaces of the first pedestal 49 and the second pedestal 59. That is, the slider 2 is supported on the metal supporting layer 4 via the first pedestal 49 and the second pedestal 59.

Note that, as shown in FIG. 8, the center portion of the first slider mounting portion 9 surrounded by the first pedestal 49 and the first pedestal base layer 47 is filled with an adhesive not shown. By such an adhesive, the rear end portion of the slider 2 is bonded and fixed to the first slider mounting portion 9. On the other hand, the center portion of the second slider mounting portion 19 surrounded by the second pedestal 59 and the second pedestal base layer 57 is filled with an adhesive not shown. By such an adhesive, the front end portion of the slider 2 is bonded and fixed to the second slider mounting portion 19.

On the other hand, as shown in FIGS. 3 and 4, the first power source wire 37 (conductive overlapping portion 28) in the base portion 5 overlaps a plane on which the slider 2 is projected when projected in the thickness direction, while the first power source wire 37 and the slider 2 are separated from each other by a space L1 in the thickness direction.

The space L1 is in a range of, e.g., not less than 1 µm, preferably not less than 3 µm, or more preferably not less than 5 µm and, e.g., not more than 30 µm, or preferably not more than 20 µm.

As shown by the imaginary line in FIG. 6(*f*) and in FIG. 8, the first piezoelectric element 15 is accommodated in the first accommodation space 16 and formed in a generally flat plate shape in plan view extending in the front-rear direction. The first piezoelectric element 15 is accommodated in the first accommodation space 16 such that the front surface thereof is in contact with the rear surface of the first front supporting portion 10 and the rear surface thereof is in contact with the front surface of the first rear supporting portion 11. On the other hand, both the left and right surfaces of the first piezoelectric element 15 are respectively located internally of the first outer connecting portion 12 and the first inner connecting portion 13 to be spaced apart therefrom. Specifically, the left surface of the first piezoelectric element 15 is spaced apart from the right surface of the first outer connecting portion 12, while the right surface of the first piezoelectric element 15 is spaced apart from the left surface of the first inner connecting portion 13.

On the respective upper surfaces of the front and rear end portions of the first piezoelectric element 15, electrodes not shown are provided. To such electrodes, the first piezoelectric-element-side power source terminal 35 and the first piezoelectric-element-side ground terminal 42 are electrically connected by, e.g., soldering, or the like.

The second piezoelectric element 25 is accommodated in the second accommodation space 26 and disposed point-symmetrically to the first piezoelectric element 15 with respect to the center portion C of the base portion 5, while being electrically connected to the second piezoelectric-element-side power source terminal 36 and the second piezoelectric-element-side ground terminal 52.

Figure 9:
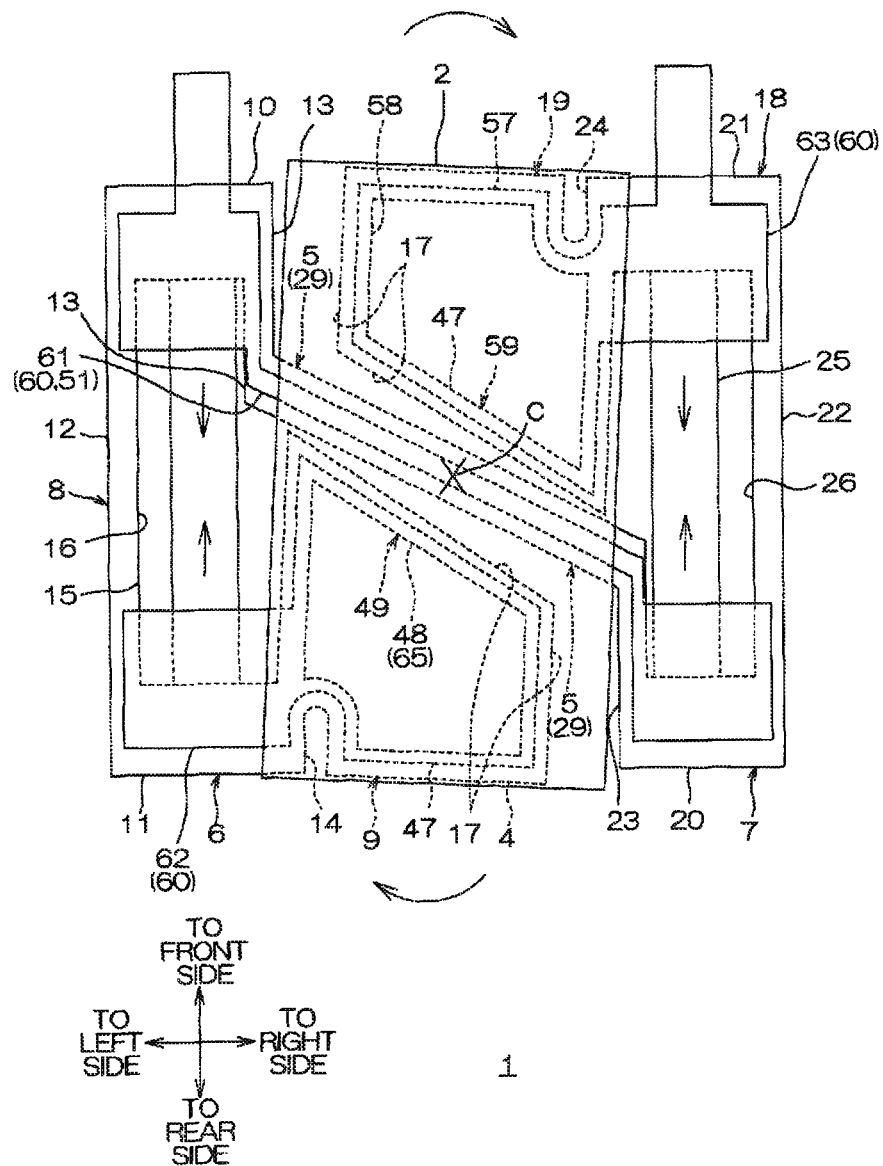
FIG. 9 shows a plan view illustrating the rotation of a slider in the head gimbal assembly shown in FIG. 7.

Next, a description is given of the rotation (rotational movement) of the slider 2 mounted on the first suspension board with circuit 1 in the head gimbal assembly 10 with reference to FIG. 9.

First, as shown in FIGS. 1, 7, and 9, to the first piezoelectric element 15, electricity is supplied from a power source not shown via the supply-side power source terminal 77, the second power source wire 78, the second circuit-side power source terminal 76, the first circuit-side power source terminal 40, the first power source wire 37, and the first piezoelectric-element-side power source terminal 35 and the voltage thereof is controlled so that the first piezoelectric element 15 contracts in the front-rear direction shown by the arrow. Likewise, to the second piezoelectric element 25, electricity is supplied from the power source not shown via the second piezoelectric-element-side power source terminal 36 and the voltage thereof is controlled so that the second piezoelectric element 25 contracts in the front-rear direction shown by the arrow.

Then, the both end portions of the base portion 5 are pressed in mutually different ways in the front-rear direction such that the first rear supporting portion 11 moves relatively frontwardly with respect to the first front supporting portion 10 (in a direction in which the first rear supporting portion 11 gets closer to the first front supporting portion 10) and the second front supporting portion 21 moves relatively rearwardly with respect to the second rear supporting portion 20 (in a direction in which the second front supporting portion 21 gets closer to the second rear supporting portion 20). That is, the position of the base portion 5 in plan view changes and, specifically, the left end portion of the base portion 5 moves rearward, while the right end portion of the base portion 5 moves frontward. This elongates the left-right length of the base portion 5.

Consequently, the first slider mounting portion 9 moves leftward, while the second slider mounting portion 19 moves rightward. That is, the first movable portion 6 and the second movable portion 7 are spaced apart from each other in the left-right direction.

As a result, the slider 2 rotates rightward (clockwise) around the center portion C of the base portion 5, as shown by the arrow in FIG. 9. Since the base portion 5 rotates leftward (counterclockwise), the slider 2 rotates relatively largely with respect to the base portion 5.

By contrast, when the first piezoelectric element 15 and the second piezoelectric element 25 elongate, the slider 2 rotates in the direction opposite to the foregoing direction, i.e., leftward (counterclockwise), though not shown.

In the first suspension board with circuit 1, the conductive layer 30 includes the first power source wire 37 in the base portion 5 serving as the conductive overlapping portion 28 which overlaps the plane on which the slider 2 is projected when projected in the thickness direction. This allows a reduction in the size of the first suspension board with circuit 1 and an increase in the density of the conductive layer 30.

In the first suspension board with circuit 1, the slider 2 is mounted over the first pedestal 49 including the first pedestal base layer 47, the first pedestal conductive layer 46, and the first pedestal cover layer 48 and the second pedestal 59 including the second pedestal base layer 57, the second pedestal conductive layer 56, and the second pedestal cover layer 58. This can ensure the space L1 provided between the conductive overlapping portion 28 and the slider 2.

In addition, in the first suspension board with circuit 1, the first pedestal base layer 47 and the second pedestal base layer 57 are included in the insulating base layer 60, the first pedestal conductive layer 46 and the second pedestal conductive layer 56 are included in the conductive layer 30, and the first pedestal cover layer 48 and the second pedestal cover layer 58 are included in the insulating cover layer 65. This allows the first pedestal 49 including the first pedestal base layer 47, the first pedestal conductive layer 46, and the first pedestal cover layer 48 and the second pedestal 59 including the second pedestal base layer 57, the second pedestal conductive layer 56, and the second pedestal cover layer 58 to be simultaneously formed together with the insulating base layer 60, the conductive layer 30, and the insulating cover layer 65. Therefore, it is possible to simplify the configuration of the layers in the first suspension board with circuit 1 including the first pedestal 49 and the second pedestal 59.

Also, in the first suspension board with circuit 1, the metal supporting layer 4 is configured to cause the slider 2 to operate in association with the first piezoelectric element 5 and the second piezoelectric element 25 based on the extension/contraction thereof. This allows the slider 2 to rotate. Therefore, it is possible to precisely adjust the position of the magnetic head 27 mounted on the slider 2.

Also, in the first suspension board with circuit 1, it is possible to effectively prevent the first power source wire 37 including the conductive overlapping portion 28 from contact with the slider 2 and also connect the first piezoelectric elements 15 and the second piezoelectric elements 25. Moreover, since the plurality of first piezoelectric elements 15 and the second piezoelectric elements 25 are provided to be spaced apart from each other such that the slider 2 is interposed therebetween, the slider 2 can efficiently be moved.

Furthermore, since the first power source wire 37 includes the conductive overlapping portion 28 which overlaps the plane on which the slider 2 is projected, it is possible to increase the density of the first power source wire 37 and consequently compactize the first suspension board with circuit 1.

In the suspension board with circuit, the first piezoelectric-element-side power source terminal 35, the first piezoelectric-element-side ground terminal 42, and the first pedestal 49 are arranged to be spaced apart from each other, while the second piezoelectric-element-side power source terminal 36, the second piezoelectric-element-side ground terminal 52, and the second pedestal 59 are arranged to be spaced apart from each other. As a result, it is possible to effectively prevent contact between the slider 2 supported on the first and second pedestals 49 and 59 and each of the terminals and effectively prevent damage to each of the terminals resulting therefrom.

<Modifications>

In the first embodiment, the first suspension board with circuit 1 is mounted on the second suspension board with circuit 3 and used as the head gimbal assembly 100. However, the head gimbal assembly 100 can also be produced by, e.g., integrally form the metal supporting layer 4 of the first suspension board with circuit 3 and the metal supporting board 80 of the second suspension board with circuit 3 and successively laminating each of the layers thereover to integrally form the first suspension board with circuit 1 and the second suspension board with circuit 3.

Also, in the first embodiment, the first suspension board with circuit 1 is mounted on the second suspension board with circuit 3, but the first suspension board with circuit 1 can also be used directly as the head gimbal assembly 100 without being mounted on the second suspension board with circuit 3.

Further, in the first embodiment, the first suspension board with circuit 1 is provided with the metal protective layer 70, but the first suspension board with circuit 1 can also be configured without being provided with the metal protective layer 70.

(Second Embodiment)

Figure 10:
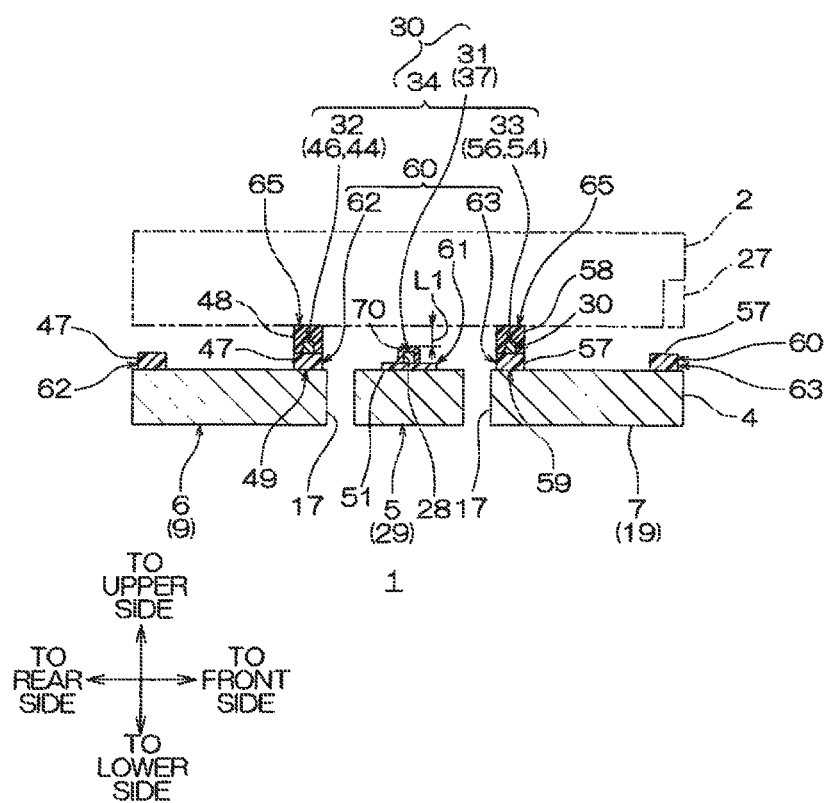
FIG. 10 shows a cross-sectional view of the first suspension board with circuit as a second embodiment of the suspension board with circuit of the present invention, which corresponds to FIG. 4.

In FIG. 10, the same members as used in the first embodiment are designated by the same reference numerals and a detailed description thereof is omitted.

As shown in FIG. 10, the first base layer 61 forming the base overlapping portion 51 can also be formed to have a thickness smaller than the thickness of each of the second base layer 62 and the third base layer 63.

Specifically, the thickness of the first base layer 61 is, e.g., not more than 70%, preferably not more than 50%, or more preferably not more than 40% of the thickness of each of the second base layer 62 and the third base layer 63 and, e.g., not less than 10% thereof. Specifically, the thickness of the first base layer 61 is in a range of, e.g., not less than 1 μm, or preferably not less than 3 μm and, e.g., not more than 7 μm, or preferably not more than 5 μm.

The insulating base layer 60 including the first base layer 61, the second base layer 62, and the third base layer 63 which have different thicknesses is formed by subjecting a coating formed from a varnish of a photosensitive insulating material to gradation exposure.

As described above, in the first suspension board with circuit 1, the first base layer 61 serving as the base overlapping portion is formed to have the thickness smaller than the thickness of each of the second base layer 62 and the third base layer 63. Therefore, it is possible to ensure the sufficient space L1 provided between the first power source wire 37 in the base portion 5 serving as the conductive overlapping portion 28 and the slider 2. Specifically the space L1 is in a range of, e.g., not less than 3 μm, or preferably not less than 5 μm and, e.g., not more than 30 μm, or preferably not more than 20 μm.

<Third Embodiment>

Figure 11:
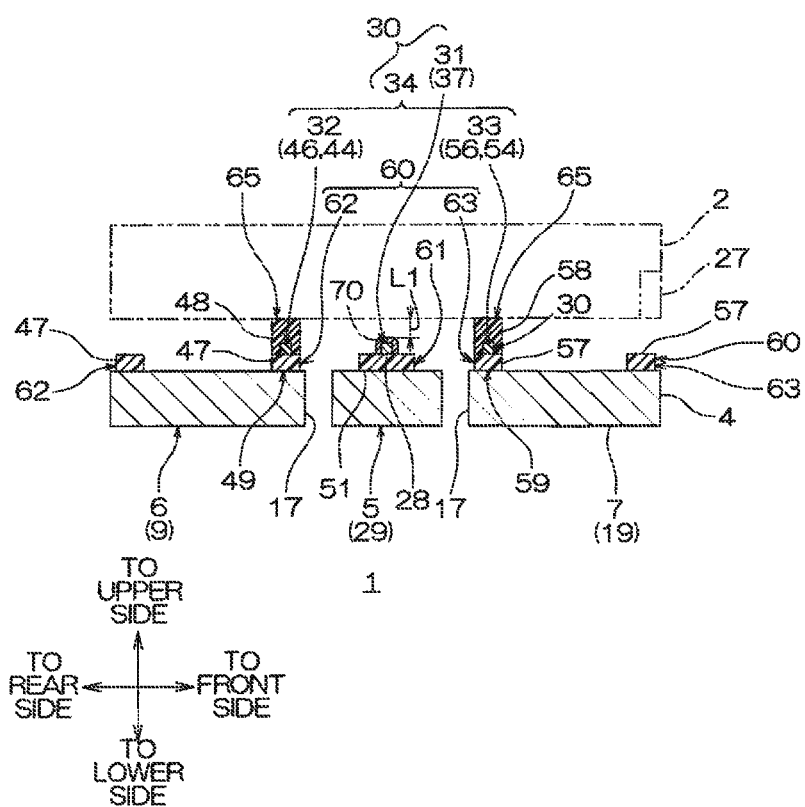
FIG. 11 shows a cross-sectional view of the first suspension board with circuit as a third embodiment of the suspension board with circuit of the present invention, which corresponds to FIG. 4.

In FIG. 11, the same members as used in the first embodiment are designated by the same reference numerals and a detailed description thereof is omitted.

The thickness of the insulating cover layer 65 is set to a value of not more than 40 μm but, as shown in, e.g., FIG. 11, the insulating cover layer 65 can also be formed to have a larger thickness. Specifically, the thickness of the insulating cover layer 65 can also be set to a value of more than 40 μm or, e.g., not more than 80 μm.

The space L1 between the first power source wire 37 and the slider 2 is in a range of, e.g., not less than 2 μm, or preferably not less than 10 μm and, e.g., not more than 40 μm, or preferably not more than 20 μm.

In the first suspension board with circuit 1, the first and second pedestal cover layers 48 and 58 and the first and second pedestals 49 and 59 are formed to have thicknesses larger than those in the first embodiment. Therefore, it is possible to ensure a sufficient space provided between the first power source wire 37 in the base portion 5 serving as the conductive overlapping portion 28 and the slider 2.

<Fourth Embodiment>

Figure 12:
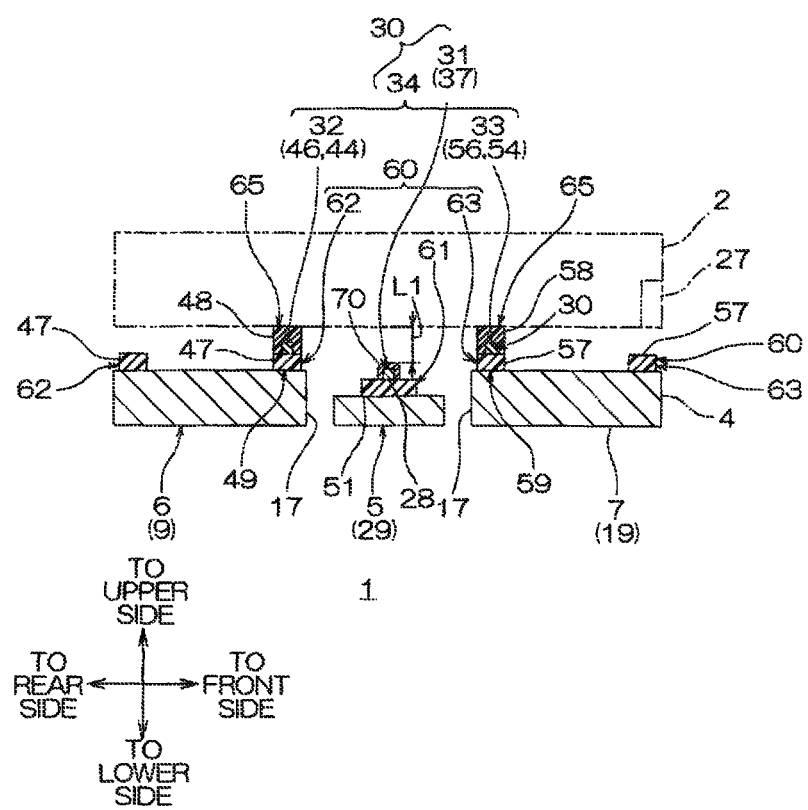
FIG. 12 shows a cross-sectional view of the first suspension board with circuit as a fourth embodiment of the suspension board with circuit of the present invention, which corresponds to FIG. 4.

In FIG. 12, the same members as used in the first embodiment are designated by the same reference numerals and a detailed description thereof is omitted.

As shown in FIG. 12, the base portion 5 in the metal supporting layer 4 serving as the base overlapping portion 51 can also be formed to have a thickness smaller than the thickness of each of the first movable portion 6 and the second movable portion 7.

Specifically, the thickness of the base portion 5 is, e.g., not more than 80%, preferably not more than 60%, or more preferably not more than 50% and, e.g., not less than 30% of the thickness of each of the first movable portion 6 and the second movable portion 7. Specifically, the thickness of the base portion 5 is in a range of, e.g., not less than 3 μm, or preferably not less than 5 μm and, e.g., not more than 120 μm, or preferably not more than 50 μm.

The metal supporting layer 4 including the base portion 5, the first movable portion 6, and the second movable portion 7 which have different thicknesses is formed by, e.g., the half-etching of the upper surface of the metal supporting layer 4 or the like.

The spacing L1 between the first power source wire 37 and the slider 2 is in a range of, e.g., not less than 5 μm, or preferably not less than 10 μm and, e.g., not more than 50 μm, or preferably not more than 30 μm.

As described above, in the first suspension board with circuit 1, the base portion 5 is formed to have a thickness smaller than the thickness of each of the first movable portion 6 and the second movable portion 7. Therefore, it is possible to ensure the sufficient space L1 between the first power source wire 37 in the base portion 5 and the slider 2.

EXAMPLES

Numerical values in EXAMPLES shown below can be replaced with the numerical values (i.e., upper limit values or lower limit values) shown in the embodiments.

Example 1

(Example Corresponding to First Embodiment)

First, a metal supporting layer made of stainless steel (SUS304) having a flat plate shape and a thickness of 50 μm was prepared (see FIG. 5(a)).

Then, onto the entire upper surface of the metal supporting layer, a varnish of a photosensitive polyamic acid resin was applied and dried to form a coating. Then, the coating was exposed to light, developed, and cured by heating to form an insulating base layer having a thickness of 10 μm in a pattern including a first base layer forming a base overlapping portion, a second base layer, and a third base layer which were independent of each other (see FIG. 5(b)).

Then, a conductive layer having a thickness of 10 μm was formed from copper into a pattern which included a power source pattern including a conductive overlapping portion, and a ground pattern by an additive method (see FIG. 5(c)).

Then, onto the entire upper surface of the metal supporting layer including the conductive layer and the insulating base layer, a varnish of a photosensitive polyamic acid resin was applied and dried to form a coating. Then, the coating was exposed to light, developed, and cured by heating to form an insulating cover layer having a thickness of 5 μm into a pattern including a first pedestal cover layer and a second pedestal cover layer (see FIG. 5(d)).

Thereafter, in the metal supporting layer, a first accommodation space and a second accommodation space were formed by chemical etching (see FIG. 6(e)).

Then, in the metal supporting layer, slits were formed, while the metal supporting layer was trimmed, to obtain a first suspension board with circuit (see FIG. 6(g)).

Thereafter, on the first suspension board with circuit, a slider was mounted.

The space L1 between the lower surface of the slider and the power source pattern in the base portion was 5 μm.

Example 2

(Example Corresponding to Second Embodiment)

A first suspension board with circuit was obtained by performing the same processing as performed in EXAMPLE 1 except that a coating was subjected to gradation exposure in the formation of an insulating base layer. Subsequently, a slider was mounted on the first suspension board with circuit.

Note that the insulating base layer was formed of a first base layer having a thickness of 5 μm, a second base layer having a thickness of 10 μm, and a third base layer having a thickness of 10 μm (see FIG. 10).

The space L1 between the lower surface of the slider and the power source pattern in the base portion was not less than 10 μm.

Example 3

(Example Corresponding to Third Embodiment)

A first suspension board with circuit was obtained by performing the same processing as performed in EXAMPLE 1 except that the thickness of each of the first pedestal cover layer and the second pedestal cover layer was changed to 12 μm. Subsequently, a slider was mounted on the first suspension board with circuit.

The space L1 between the lower surface of the slider and the power source pattern in the base portion was not less than 10 μm.

Example 4

(Example Corresponding to Fourth Embodiment)

A first suspension board with circuit was obtained by performing the same processing as performed in EXAMPLE 1 except that the upper surface of a metal supporting layer was half-etched. Subsequently, a slider was mounted on the first suspension board with circuit.

Note that the thickness of a base portion as a support overlapping portion in the metal supporting layer was 20 μm and the thickness of each of a first movable portion and a second movable portion was 50 μm.

The space L1 between the lower surface of the slider and a power source pattern in the base portion serving as the support overlapping portion was not less than 10 μm.

While the illustrative embodiments of the present invention are provided in the above description, such is for illustrative purpose only and it is not to be construed limitative. Modification and variation of the present invention which will be obvious to those skilled in the art is to be covered by the following claims.

What is claimed is:

1. A suspension board with circuit, comprising:
a metal supporting layer;
an insulating base layer formed on the metal supporting layer;
a conductive layer formed on the insulating base layer; and
a slider supported on the metal supporting layer via a pedestal, wherein
the conductive layer includes a conductive overlapping portion which overlaps a plane on which the slider is projected when projected in a thickness direction, and
the conductive overlapping portion is provided to be spaced apart from the slider and extends along a first direction,
the pedestal includes a first pedestal and a second pedestal disposed opposite each other across the conductive overlapping portion, and
the first pedestal and the second pedestal extend along the first direction.

2. A suspension board with circuit according to claim 1, further comprising:
an insulating cover layer formed on the insulating base layer so as to cover the conductive layer, wherein
the pedestal includes:
a pedestal base layer included in the insulating base layer;
a pedestal conductive layer included in the conductive layer and formed on the pedestal base layer; and
a pedestal cover layer included in the insulating cover layer and formed on the pedestal base layer so as to cover the pedestal conductive layer.

3. A suspension board with circuit according to claim 1, further comprising:
a piezoelectric element electrically connected to the conductive layer, wherein
the metal supporting layer is configured to cause the slider to operate in association with the piezoelectric element based on extension/contraction thereof.

4. A suspension board with circuit according to claim 3, wherein
a plurality of the piezoelectric elements are provided to be spaced apart from each other such that the slider is interposed therebetween when projected in the thickness direction,
the conductive layer includes a wire connecting the plurality of piezoelectric elements, and
the wire includes the conductive overlapping portion.

5. A suspension board with circuit according to claim 1, wherein
the conductive layer includes a terminal electrically connected to a piezoelectric element, and
the terminal and the pedestal are arranged to be spaced apart from each other.

6. A suspension board with circuit according to claim 1, wherein
the insulating base layer includes a base overlapping portion which overlaps the plane on which the slider is projected when projected in the thickness direction to support the conductive overlapping portion, and
the base overlapping portion is formed to have a thickness smaller than a thickness of the portion of the insulating base layer other than the base overlapping portion.

7. A suspension board with circuit according to claim 1, wherein
the metal supporting layer includes a support overlapping portion which overlaps the plane on which the slider is projected when projected in the thickness direction to support the conductive overlapping portion, and
the support overlapping portion is formed to have a thickness smaller than a thickness of the portion of the metal supporting layer other than the support overlapping portion.

8. A suspension board with circuit according to claim 2, wherein a thickness of the pedestal cover layer is greater than 40μm and less than or equal to 80μm.

9. A suspension board with circuit, comprising:
a metal supporting layer;
an insulating base layer formed on the metal supporting layer;
a conductive layer formed on the insulating base layer; and
a slider supported on the metal supporting layer via a pedestal, wherein
the conductive layer includes a conductive overlapping portion which overlaps a plane on which the slider is projected when projected in a thickness direction, and
the conductive overlapping portion is provided to be spaced apart from the slider; further comprising:
a plurality of piezoelectric elements electrically connected to the conductive layer, wherein
the metal supporting layer is configured to cause the slider to operate in association with the plurality of piezoelectric elements based on extension/contraction thereof, wherein
the plurality of the piezoelectric elements are provided to be spaced apart from each other such that the slider is interposed therebetween when projected in the thickness direction,
the conductive layer includes a wire connecting the plurality of piezoelectric elements, and
the wire includes the conductive overlapping portion.

10. A suspension board with circuit, comprising:
a metal supporting layer;
an insulating base layer formed on the metal supporting layer;
a conductive layer formed on the insulating base layer; and
a slider supported on the metal supporting layer via a pedestal,
wherein the conductive layer includes a conductive overlapping portion which overlaps a plane on which the slider is projected when projected in a thickness direction,
wherein the conductive overlapping portion is provided to be spaced apart from the slider,
wherein the metal supporting layer includes a support overlapping portion which overlaps the plane on which the slider is projected when projected in the thickness direction to support the conductive overlapping portion, and
wherein the support overlapping portion is formed to have a thickness smaller than a thickness of the portion of the metal supporting layer other than the support overlapping portion.

* * * * *